US012805668B2

(12) United States Patent
Tepel et al.

(10) Patent No.: US 12,805,668 B2
(45) Date of Patent: Nov. 24, 2026

(54) FOOD PROCESSOR WITH MONITORING DEVICE

(71) Applicant: Vorwerk & Co. Interholding GmbH, Wuppertal (DE)

(72) Inventors: Phillipp Tepel, Wuppertal (DE); Mirco Pieper, Wuppertal (DE); Stefan Kraut-Reinkober, Leverkusen (DE)

(73) Assignee: Vorwerk & Co. Interholding GmbH (DE)

( * ) Notice: Subject to any disclaimer, the term of this patent is extended or adjusted under 35 U.S.C. 154(b) by 1107 days.

(21) Appl. No.: 16/804,619

(22) Filed: Feb. 28, 2020

(65) Prior Publication Data

US 2020/0281399 A1 Sep. 10, 2020

(30) Foreign Application Priority Data

Mar. 5, 2019 (EP) .................................... 19160780

(51) Int. Cl.
*A47J 44/00* (2006.01)
*A47J 27/00* (2006.01)
(Continued)

(52) U.S. Cl.
CPC ............. *A47J 44/00* (2013.01); *A47J 27/004* (2013.01); *A47J 36/32* (2013.01); *A47J 43/0716* (2013.01);
(Continued)

(58) Field of Classification Search
CPC .......... A47J 44/00; A47J 27/004; A47J 36/32; A47J 43/0716; A47J 2043/0733; G05B 19/042; G05B 2219/2643; F24C 7/08
(Continued)

(56) References Cited

U.S. PATENT DOCUMENTS

| | | | | |
|---|---|---|---|---|
| 7,409,311 | B2 * | 8/2008 | Imgram | F24C 7/08 702/132 |
| 9,119,501 | B2 * | 9/2015 | Xie | A47J 27/004 |

(Continued)

FOREIGN PATENT DOCUMENTS

| | | | |
|---|---|---|---|
| DE | 102010037769 | * | 3/2012 |
| DE | 102010037769 | A1 | 3/2012 |

(Continued)

OTHER PUBLICATIONS

Office Action for Application No. EP19160780.3, dated May 30, 2022 (3 pages).

*Primary Examiner* — Ibrahime A Abraham
*Assistant Examiner* — Joseph W Iskra
(74) *Attorney, Agent, or Firm* — Barnes & Thornburg

(57) ABSTRACT

The present disclosure relates to a food processor for performing a food preparation process by heating, chopping and/or mixing a food in a food preparation vessel, wherein the food processor comprises a sensor for measuring a condition of the food processor or a food in the food preparation vessel, and a monitoring device for monitoring the measured condition. The monitoring device is configured such that the monitoring device determines a monitoring result based on the measured condition and initiates an action in dependence of the monitoring result. The monitoring device is configured such that the monitoring takes place in dependence of a recipe for preparing a food. The present disclosure further relates to a method. By this means, a reproducible cooking result of high quality can be achieved with a particularly high degree of reliability and a guaranteed success can be better maintained.

15 Claims, 2 Drawing Sheets

Figure 1:
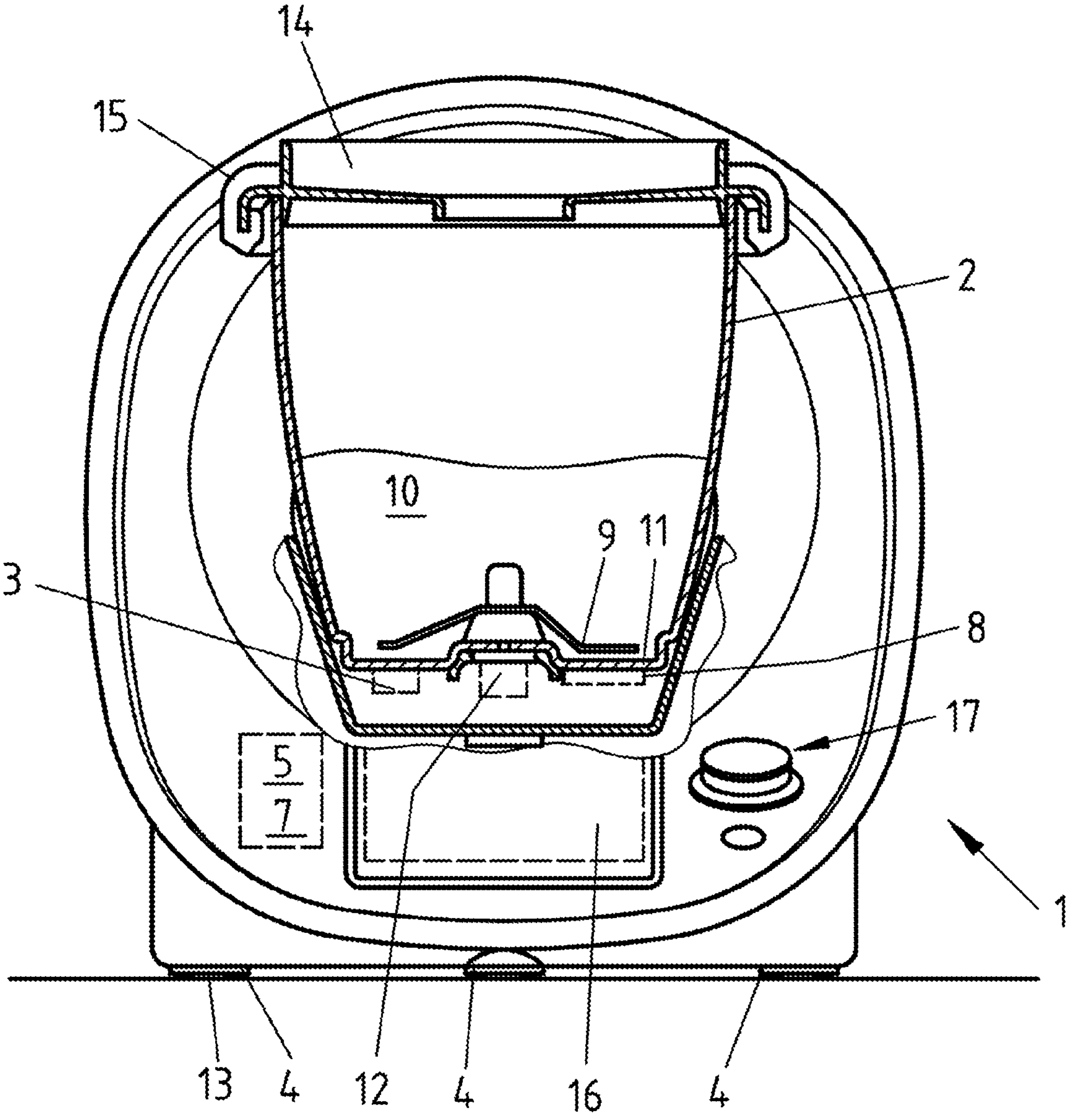

(51) Int. Cl.

| | |
|---|---|
| ***A47J 36/32*** | (2006.01) |
| ***A47J 43/07*** | (2006.01) |
| ***F24C 7/08*** | (2006.01) |
| ***G05B 19/042*** | (2006.01) |

(52) U.S. Cl.
CPC .............. *F24C 7/08* (2013.01); *G05B 19/042* (2013.01); *A47J 2043/0733* (2013.01); *G05B 2219/2643* (2013.01)

(58) Field of Classification Search
USPC ............................................................ 99/325
See application file for complete search history.

(56) References Cited

U.S. PATENT DOCUMENTS

| | | | | |
|---|---|---|---|---|
| 10,555,633 | B2 * | 2/2020 | Choudhary | A23L 5/10 |
| 2006/0257536 | A1 * | 11/2006 | Tiesinga | A47J 37/1266 426/231 |
| 2015/0164281 | A1 * | 6/2015 | Koetz | A47J 43/00 366/145 |
| 2015/0305564 | A1 * | 10/2015 | Jimenez | A47J 43/0716 366/141 |
| 2017/0224148 | A1 * | 8/2017 | Koennings | G05B 15/00 |

FOREIGN PATENT DOCUMENTS

| | | | | | |
|---|---|---|---|---|---|
| DE | 102016110687 | | * | 12/2017 | |
| EP | 2989940 | | * | 3/2016 | |
| EP | 2989940 | A1 | | 3/2016 | |
| WO | WO-2017211963 | | * | 12/2017 | |
| WO | WO-2017211963 | A1 | * | 12/2017 | A47J 43/046 |
| WO | WO-2017211969 | A1 | * | 12/2017 | A47J 27/004 |

* cited by examiner

FOOD PROCESSOR WITH MONITORING DEVICE

PRIORITY CLAIM

This application claims priority to European Patent Application No. 19160780.3, filed Mar. 5, 2019, which application is hereby incorporated in its entirety herein.

FIELD OF THE DISCLOSURE

The present disclosure relates to a food processor for performing a food preparation process by heating, chopping and/or mixing a food in a food preparation vessel. The food processor comprises a sensor for measuring a condition of the food processor or a food in the food preparation vessel and a monitoring device for monitoring the measured condition. The monitoring device is configured such that the monitoring device determines a monitoring result based on the measured condition and initiates an action in dependence of the monitoring result.

BACKGROUND

Food processors that provide stored recipes and support a partially automated execution of several steps of a recipe are often offered with a so-called "guaranteed success". The user expects a consistently high quality cooking result when a food is prepared using such a food processor.

It is the task of the present disclosure to provide a food processor which enables a reproducible cooking result of high quality with particularly high reliability.

SUMMARY

A food processor and a related methods according to the present disclosure serve to enable reproducible cooking results of high quality with particularly high reliability.

Problems related to reproducible cooking are solved by a food processor for performing a food preparation process including heating, chopping, and/or mixing a food in a food preparation vessel. The food processor comprises a sensor for measuring a condition of the food processor or a food in the food preparation vessel. The food processor further comprises a monitoring device for monitoring the measured condition. The monitoring device is configured such that the monitoring device determines a monitoring result based on the measured condition and initiates an action depending on the monitoring result.

The monitoring device is configured such that the monitoring takes place in dependence of a recipe for preparing a food. In this way a reproducible cooking result can be ensured in an improved manner and a cooking result with high quality can be achieved particularly reliably.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2A:
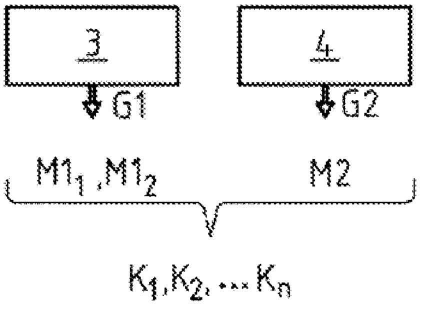
Figure 2B:
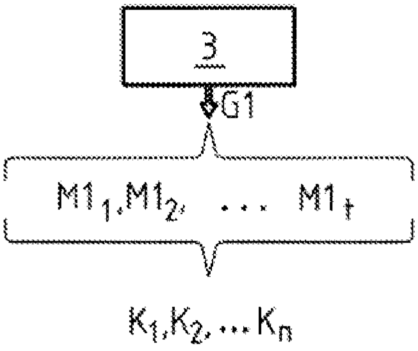
Figure 2C:
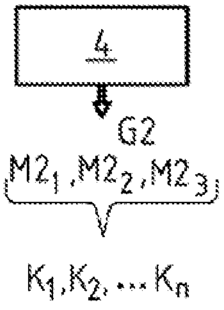
Figure 3:
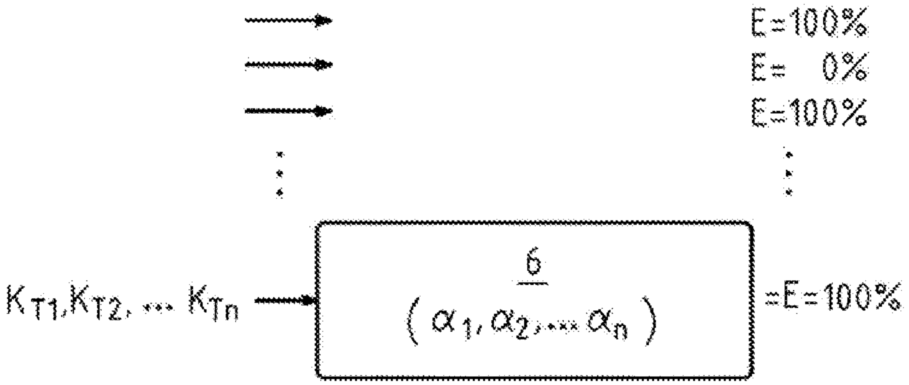
Figure 4:
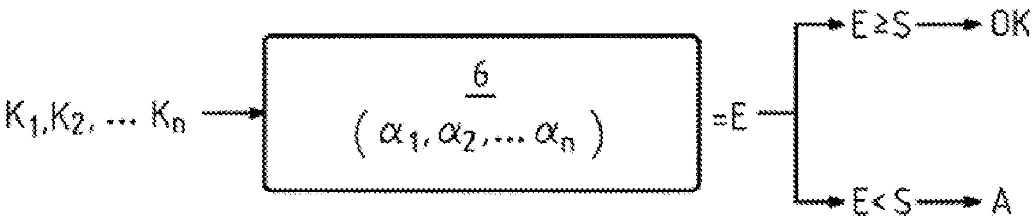

FIG. 1 is a schematic view of a food processor;

FIG. 2*a* is one schematic representation of the receiving of characteristics;

FIG. 2*b* is a second schematic representation of the receiving of characterisitics;

FIG. 2*c* is a third schematic representation of the receiving of characteristics;

FIG. 3 is a schematic representation of a training phase of a desired profile; and FIG. 4 is a schematic representation of the use of the desired profile of FIG. 3 for monitoring a food preparation process of a recipe step with the plurality of characteristics of one of FIGS. 2*a* to 2*c*.

DETAILED DESCRIPTION

FIG. 1 shows a food processor 1 with a heating element 8 for heating and a mixing tool 9 for chopping and/or mixing a food 10 in a food preparation vessel 2. The heating element 8 and a temperature sensor 3 are integrated in the area of the bottom 11 of the food preparation vessel 2. A motor 12 drives the mixing tool 9 with a torque and a speed that depends on the motor current to operate the motor 12. Weight sensors 4 are mounted in the area of support elements 13 such that the measured weight correlates with the food 10 in the food preparation vessel 2. The food preparation vessel 2 can be closed by means of a lid 14 which can be fixed to the food preparation vessel 2 by a locking means 15. The user interface of the food processor comprises a display 16 for displaying an indication and an operating member 17 for operating the user interface by the user. The food processor 1 comprises a control unit 7 and a monitoring device 5, which in one configuration form part of a common device having at least one processor and a memory, wherein a program code with instructions can be stored in the memory, the instructions of which cause the control unit and/or the monitoring device to carry out process steps. The control unit 7 can access a plurality of recipes each having several at least partially automated recipe steps or has recipes stored in the memory. Based on a recipe or recipe step, the control unit 7 can control the food processor 1, e.g. the heating element 8, the motor 12 or the display 16.

As FIGS. 2*a* to 2*c* illustrate, the monitoring device 5 determines a measured quantity G1, e.g. a temperature which is measured by the temperature sensor 3. The monitoring device 5 also determines a measured quantity G2, e.g. a weight which is measured by the weight sensor 4. The two measured quantities describe the property of the food 10 in the food preparation vessel 2 in relation to temperature and weight during the execution of a recipe step. FIG. 2*a* shows one configuration in which two different sensors 3, 4 are provided to detect different measured quantities G1, G2. At the time of analysis dependent on the recipe step, the first sensor 3 measures two measured values $M1_1$, $M1_2$ of the measured quantity G1 (temperature) and the second sensor 4 measures only one measured value M2 of the measured quantity G2 (weight). From the measured values $M1_1$, $M1_2$, M2 together, the monitoring device 5 calculates the plurality of characteristic values $K_1, K_2, \ldots K_n$, where n is the number of characteristic values. FIG. 2*b* shows one configuration in which a sensor 3 measures several measured values $M1_1$, $M1_2$, . . . $M1_t$ of a measured quantity G1 (temperature) in a time-resolved manner within a time window dependent on the recipe step. The time-resolved measured values $M1_1$, $M1_2$, . . . $M1_t$ with a number t of measured values are then used as a whole to calculate the pluralities of the characteristic values $K_1, K_2, \ldots K_n$. In this, e.g. $K_1$ corresponds to the median and $K_2$ to the MAD of the time-resolved curve of the measured values $M1_t$, $M1_2$, . . . $M1_t$. The entire curve is always used as a whole for the calculation of the plurality of characteristic values $K_1$, $K_2, \ldots K_n$. The curve or the measured values $M1_1$, $M1_2$, . . . $M1_t$ are not divided into separate regions or similar. FIG. 2*c* shows a configuration in which only a one-digit number of measured values $M2_1$, $M2_2$, $M2_3$ of the measured quantity G2 (weight) is measured by weight sensor 4. From these measured values $M2_1$, $M2_2$, $M2_3$ the plurality of characteristic values $K_1$, $K_2$, . . . $K_n$ are then calculated. In particular, the calculation of the plurality of the characteristic values $K_1$, $K_2$, . . . $K_n$ in use at the end user as illustrated in FIG. 4 is identical with the calculation method of the respective characteristic values $K_{T1}$, $K_{T2}$, . . . $K_{Tn}$ in a training phase illustrated in FIG. 3.

FIG. 3 shows a training phase for generating the desired profile 6. A plurality of weighting factors $\alpha_1$, $\alpha_2$, . . . $\alpha_n$ for weighting the characteristic values $K_{T1}$, $K_{T2}$, . . . $K_{Tn}$ are determined in the training phase and specified for later use after the training phase. To determine the weighting factors $\alpha_1$, $\alpha_2$, . . . $\alpha_n$ a series of food preparation processes of a recipe step are performed, for which recipe step the desired profile 6 is generated. On the one hand, variations and deviations are made with regard to the ingredients or the quality of the ingredients that nevertheless lead to an acceptable cooking result (E=100%) and on the other hand, variations and deviations that do not lead to an acceptable cooking result (similarity value E=0%). From each of these food preparation processes, a plurality of training parameters $K_{T1}$, $K_{T2}$, . . . $K_{Tn}$ are calculated and are fed into the desired profile 6 together with the monitoring result in the form of a given similarity value E. In this way the similarity value E is not variable as in later use. The weighting factors $\alpha_1$, $\alpha_2$, . . . $\alpha_n$ which have not yet been specified, can thus be determined in such a way that the desired profile 6 represents the behaviour during the food preparation process of the recipe step.

FIG. 4 illustrates the monitoring process using the desired profile 6 obtained in the manner described above. During the execution of a food preparation process, the plurality of characteristic values $K_1$, $K_2$, . . . $K_n$ for a particular recipe step are calculated as illustrated in FIGS. 2*a* to 2*c* and fed as input values to the desired profile 6 for this recipe step. With the aid of the desired profile 6, whose weighting factors $\alpha_1$, $\alpha_2$, . . . $\alpha_n$ for the respective characteristic values $K_1$, $K_2$, . . . $K_n$ represent the behaviour for this recipe step, the similarity value E can be determined with the plurality of the characteristic values $K_1$, $K_2$, . . . $K_n$, which is in particular a number between 0 and 1. The similarity value describes (especially at the time of analysis) the similarity of the condition of the food 10 in the food preparation vessel 2 with an ideal condition that would lead to the best possible cooking result, wherein cooking results in a certain similarity range also meet the specified requirements for acceptable reproducibility and quality. The monitoring device 5 initiates an action A of the food processor 1 if the similarity value E of a recipe step falls below a recipe step-dependent monitoring threshold S and thus leaves the similarity range defined as acceptable. Action A can be a notice to the user with an information or instruction and/or a change of a cooking parameter. Otherwise, if everything is “OK”, no action is initiated.

Recipe means an electronically stored recipe. The recipe contains information that is displayed to the user as an indication and/or that controls the food processor. For example, a heating element or a mixing tool is controlled by one or more pieces of information in the recipe. According to a recipe, a food is made from ingredients. Such a recipe can be divided into individual steps, which must be carried out one after the other to obtain the food. Adding an ingredient to the food preparation vessel can be a first step. Chopping an ingredient in the food preparation vessel can be a second step. Subsequent heating of the chopped ingredient can be a third step. Such steps are called recipe steps in the following. A food can be solid, viscous or liquid. A food can be a drink, an ingredient or a mixture of ingredients.

In one embodiment, the monitoring device is configured such that a plurality of characteristic values for characterizing the condition is calculated based on the measurement of the sensor. The measured condition can be monitored with very high accuracy using the plurality of characteristic values and thus a good cooking result can be ensured in an improved manner. The monitoring device determines in one configuration the monitoring result based on the calculated characteristic values. The accuracy of the monitoring result can thus be improved in order to achieve a particularly reliable cooking result with high quality. In one configuration, at least 2 and/or at most 40 characteristic values are provided, preferably per recipe or per recipe step, in order to achieve a cooking result of high quality. A characteristic value is a numerical value obtained by a special calculation which is different for each of the characteristic values of the plurality of characteristic values. Each of the characteristic values therefore describes a different characterization feature of the condition.

A sensor measures a measured value, from which a measured quantity can be determined by means of a specified mathematical formula. A measured quantity describes a certain property of the condition of the food processor or the food in the food preparation vessel. A sensor therefore measures measured values in a direct way and a measured quantity in an indirect way. The measured condition refers to the condition of the food processor or the food in the food preparation vessel of which at least one property is measured by the sensor.

Preferably, the measured quantity is a temperature of the food preparation vessel, a temperature of a food in the food preparation vessel, a weight, a heating power for a heating element for heating or a motor current for driving a mixing tool for chopping and/or mixing. From the measured values of only one measured quantity, a plurality of different characteristic values can be calculated. The different characteristic values are each calculated by different mathematical operations, such as forming an integral, a derivative (differential quotient), a median or a mean value, preferably a MAD (mean absolute deviation), a Fast Fourier Transform or a Hilbert Transform. Interpolation, extrapolation, standard deviation, variance, minimum or maximum are also possible. It has been shown that a very good cooking result can be further improved by monitoring, which is carried out using such characteristic values.

In one embodiment, for each recipe a separate desired profile (target profile, set profile) is provided which can be accessed by the monitoring device for monitoring the condition. By monitoring using recipe-dependent desired profiles, the accuracy of the monitoring result and thus the reproducibility and quality of the food is increased. If a recipe comprises several recipe steps, a separate desired profile is preferably provided for each recipe step of a recipe. Basically, only one desired profile per recipe step is provided in this configuration. In particular, the monitoring device can access desired profiles that are stored in the monitoring device itself and/or that can be obtained or used via a data interface.

In one embodiment, the food processor comprises a control unit which is configured such that the control unit can access a plurality of recipes. In particular, the control unit can access the recipes which are stored in the control unit itself and/or which are stored externally, i.e. spatially separated from the food processor, in a database. The control unit can access externally stored recipes via a data interface in order to use them.

In a further embodiment the recipe includes a plurality of recipe steps. The division of a recipe into recipe steps facilitates a precise implementation of the recipe by the user with the help of the food processor. In particular, there are recipe steps that cause the control unit to display a message to the user on a food processor display, e.g. that the user should add an ingredient to the food preparation vessel. Preferably, there are recipe steps which cause the control unit to control a heating element and a mixing tool. In particular, a user interface operation by the user triggers the food processor to perform a recipe step.

In a further embodiment the control unit can control the food preparation process for the food at least at least partially automatically on the basis of the recipe or the recipe steps of the recipe. The reproducibility of the cooking result can be increased by partial automation.

Partially automated means that parts of an operation step of a user to perform a recipe or recipe step are automated. For example, when weighing an ingredient or setting a target temperature or speed of the mixing tool, the user is already shown the target value according to the recipe or recipe step. In another example, when activating the mix tool, the control unit sets the target temperature at the same time automatically.

In one embodiment for each recipe step of the recipe a separate desired profile is provided which can be accessed by the monitoring device for monitoring the condition. An improved accuracy of the monitoring of the individual recipe steps and thus an improved cooking result can be achieved. Furthermore, according to the specific process of a recipe step, optimal measured quantities and calculation formulas for calculating the characteristic values from the measured values of the respective measured quantities for characterising the specific process can be defined and used for monitoring. For example, in a recipe step with a chopping process, characteristic values from the motor current can be defined and calculated for the mixing tool if the mechanical resistance of the food during chopping is particularly significant.

In one embodiment the desired profile is a system of equations or an algorithm. This allows a monitoring with very little computational effort and at the same time a very precise monitoring result to ensure a very good cooking result. Preferably a learning algorithm can be used. In particular, the desired profile is a learning set of rules.

In one configuration the desired profile for a recipe or recipe step is generated by performing a series of food preparation processes of the recipe or recipe step in a training phase. A plurality of characteristic values are calculated from measured values, wherein influencing variables are varied within a range that still allows a reproducible and high-quality cooking result. The system of equations or the algorithm can be given a monitoring result, for example as a percentage value such as 100%. The influencing variables and their deviations include the quality of the ingredients, e.g. soft or hard potatoes, as well as minor deviations from the recipe or recipe steps. For example, parsnips can be used instead of carrots within a variation.

In a supplementary configuration the desired profile for a recipe or recipe step is generated by performing a series of food preparation processes of the recipe or recipe step in the training phase and thereby calculating the plurality of characteristic values from the measurement, wherein influencing variables are varied within a range which leads to an undesirable cooking result, whereby the system of equations or algorithm can be given the corresponding monitoring result, e.g. 0%. The influencing variables and their deviations include the quality of the ingredients, e.g. rotten tomatoes instead of fresh tomatoes, as well as inadmissible deviations from the recipe or recipe step, e.g. lettuce instead of potatoes or vinegar, oil or soy sauce instead of water.

In principle, it is possible in one configuration to extend the training phase at least partially into the application phase at the end user in order to adapt the desired profile to the characteristics of the end user. This ensures a very good cooking result in a further improved manner. Through the training phase weighting factors of the desired profile are determined and in this way the behaviour of a food processor or a food in the food preparation vessel during a food preparation process is represented in the system of equations or algorithm. The desired profile generated in this way makes it possible to obtain a monitoring result by entering the plurality of characteristic values.

In one embodiment, the system of equations or the algorithm comprises weighting factors specified for the respective recipe or recipe step to provide a recipe-dependent or recipe step-dependent desired profile. This allows representation of the model system behaviour of a food preparation process with a reproducible and high-quality cooking result in the system of equations or algorithm. A deviation of the cooking process e.g. due to an excessively changed quality of an ingredient or a wrong ingredient can be quantified in this way by the monitoring result, especially in the form of a similarity with a value between 0 and 1, especially as a percentage.

By specifying the weighting factors, especially in a training phase, for each recipe step, the food preparation process can be represented very precisely in the system of equations or the algorithm.

In one embodiment, in a desired profile each characteristic value is assigned a weighting factor for weighting the characteristic value. Since each recipe or recipe step has different state properties and state changes, weighting factors assigned to each characteristic value allow the desired cooking process to be represented particularly precisely and reliably in the system of equations or the algorithm. The weighted characteristic value and its characteristics enable a particularly reliable recognition of the desired condition and the detection of any deviation from it during the execution of a food preparation process. At the same time, a particularly efficient system of equations or a particularly efficient algorithm can be obtained by specifying the weighting factors, which enables a complex, quantitative evaluation with particularly low computing capacity.

In one embodiment, the monitoring device is configured such that the system of equations or the algorithm outputs the monitoring result by inputting the calculated characteristic values. A particularly efficient monitoring, which requires comparatively little computing capacity, is thus possible.

In one embodiment the monitoring result is a similarity value which describes the similarity of the measured condition to the desired profile, preferably as a percentage. Compared to a conventional threshold monitoring of measured values, the evaluation of the monitoring with the result of a similarity value allows a particularly differentiated evaluation of the condition of the food preparation process of a recipe step. Depending on how important the respective recipe step is for the final cooking result and its reproducibility and quality, a higher or lower similarity can be allowed. For example, a cooking step in which a spice mixture is premixed is less relevant for the cooking result than heating and chopping in the upper temperature range, where it is decided whether the food has become too soft or too hard or too coarse or too fine. In the latter case, for example, a higher similarity to the desired condition can be required within monitoring. A corresponding specification of the required similarity can be easily realized by providing a similarity value in the form of a number, especially between zero and one.

In one configuration a monitoring threshold is provided for the monitoring result and/or the monitoring device is configured such that the action is initiated if the monitoring result falls below or exceeds the monitoring threshold. The resulting possibility of adjusting the monitoring depending on the relevance of each single recipe step increases the tolerance of the monitoring for less relevant deviations and avoids unnecessary initiation of actions.

In one embodiment a monitoring threshold is provided for the similarity value and the monitoring device is configured such that if the similarity value falls below the monitoring threshold, the action is initiated. The similarity value indicates a low similarity to the desired condition with a low numerical value and a high similarity to the desired condition with a high numerical value. A low similarity implies a large deviation and accordingly a large similarity implies a small deviation from the desired condition. A particularly tolerant yet reliable monitoring system can be obtained to achieve a high-quality cooking result, especially with a false positive rate of <0.1% and/or a false negative rate of <1%. False positive means that an action is initiated even though the monitored food preparation process is going as desired. False negative means that no action is initiated even though the monitored food preparation process is not going as desired.

The similarity value is a measure of the deviation from the desired result. The desired result can refer to a condition of a food in the food preparation vessel. The desired result can also refer to the result that results from a recipe step. Through the weighting factors, the individual characteristics according to the plurality of characteristic values can be used in the determination of the similarity value recipe-dependent or recipe step-dependent differently weighted with different influence.

In one embodiment a sensor is adapted for measuring only one measured quantity such as a temperature. A measurement of only one measured quantity basically contains several measured values. Preferably, the measured values are directly successive, separate measurement signals, which are transmitted from the sensor to the monitoring device or the control unit.

In one configuration the sensor is a temperature sensor for measuring a temperature. For example, the temperature of the food preparation vessel and/or the temperature of the food in the food preparation vessel is measured. In one configuration the sensor is a weight sensor for measuring a weight, for example the weight of a part of the food processor and/or the food preparation vessel. The food preparation vessel can be supported by one or more support elements of the food processors. One or more support elements can be coupled to a weight sensor in such a way that the weight of the food in the food preparation vessel can be calculated from the weight measured. In one configuration the sensor is a current sensor for measuring an electric current with which a motor operates a mixing tool for chopping and/or mixing. In one configuration, the sensor is a sensor for measuring the speed, in particular the actual speed or target speed, or the torque of the mixing tool. In one configuration, the sensor is a sensor for measuring an electrical power used to operate a heating element for heating. The sensors for current and electrical power may also be part of the control device. Furthermore, a sensor can be used to measure a volume (sound level), an unbalance or a pressure. An optical sensor may be used. A sensor for image recognition may be used. In principle, geoinformation and volume (three-dimensional space occupied) can also be taken into account.

In one embodiment, the measurement of the sensor, on the basis of which the plurality of characteristic values is calculated, includes several time-resolved measured values of the measured quantity. A sensor therefore measures measured values in a time-resolved manner from which several characteristic values are calculated. Measured values of a measured quantity measured in a time-resolved manner over a time window can be represented by a measurement curve. Characteristic values can be obtained from a measurement curve, preferably by forming an integral, a median, a MAD or a derivative.

In one embodiment, the monitoring device is configured such that the monitoring takes place during the food preparation process at a recipe-dependent analysis time. At the analysis time, for example, two different measured quantities such as weight and temperature can be measured. In one embodiment, the monitoring device is configured such that the monitoring takes place from a recipe-dependent analysis time and/or within a recipe-dependent time window. In this way, computing capacity can be saved on the one hand, and on the other hand, it can be used to calculate a larger number of characteristic values or parallel monitorings with several desired profiles. With little technical effort a very good preparation result can be guaranteed.

In one configuration the measurement is performed in a time window starting at the beginning of a recipe or recipe step and/or ending at an end time before an end of the recipe or recipe step. One potential advantage of starting the time window immediately after the beginning of the recipe or recipe step is that a measurement curve is obtained from the beginning which allows the calculation of particularly meaningful characteristic values. In this case the measurement of the at least one measured quantity such as the motor current takes place after a food preparation process has been started by selecting a recipe or recipe step by operating a user interface. The characteristic values specified for this recipe or recipe step are then calculated from the measured values, e.g. by mathematical operations and/or a reference curve fit, until the plurality of characteristic values are available.

Specifying the end of the time window with an end time before an end of a recipe or recipe step saves computing capacity compared to permanent monitoring. Nevertheless, even with this embodiment it is possible to ensure a very good preparation result. In addition, deviations can still be detected by early evaluation if the deviations have not yet caused an undesirable cooking result. A cooking process can thus be "saved", even if deviations, for example in the ingredients, are already present, but can possibly be compensated for by intervening in the cooking process. This will be discussed in more detail later in connection with the action that can be initiated by the monitoring device.

In one configuration the time window for measuring starts time-shifted after the start of the recipe or recipe step. In this way, computing capacity can be saved without having a negative effect on the result of preparing a food or a drink.

In one configuration a time window of less than 10 or 20 seconds is provided for a measurement. A short time window in the above mentioned range allows a calculation of characteristic values that depend on a change of the condition over time, e.g. derivative, integral, MAD, median or mean value. At the same time, computing capacity can be saved without having a negative effect on the result of a preparation. Preferably, the time window extends in dependence of a defined analysis time. The time window starts with a time difference before the analysis time, which corresponds to half of the time window, and ends with a time difference after the analysis time, which corresponds to the other half of the time window.

In one configuration a time window is temperature dependent. This allows the calculation of particularly meaningful characteristic values. Preferably, the time window then extends over a period of time in which the temperature changes by less than 10° C. or 20° C. Preferably, the time window extends in dependence of a defined analysis temperature. The time window then starts at a difference of 5° C. or 10° C. from the analysis temperature and/or ends after reaching the analysis temperature at a difference of 5° C. or 10° C. from the analysis temperature. This can be particularly advantageous for a recipe or recipe step in which the temperature rises continuously.

In one configuration the analysis temperature is a defined temperature value between 100° C. and 120° C., preferably about 110° C. Particularly helpful characteristic values can be calculated in this way. Preferably, the analysis temperature and/or the temperature window is specified individually for each recipe or recipe step to ensure a very good result in a further improved manner. In one configuration the measurement is performed in a time window that starts with the beginning of a recipe or recipe step and ends when the analysis temperature is reached. The reaching of the analysis temperature then defines the end time before the end of the recipe or recipe step.

In one configuration the analysis time is between 30 seconds and 60 seconds, preferably about 50 seconds, after the start of a recipe or recipe step. Particularly meaningful characteristic values can be calculated in this way. Preferably, the analysis time and/or the time window for each recipe or recipe step is specified individually in order to ensure a very good result in a further improved manner. In one configuration the measurement is performed in a time window that starts with the start of a recipe or recipe step and ends when the analysis time is reached.

In one configuration, the sensor is a sensor for a measured quantity from whose measured values a mechanical condition of the food processor can be determined. In particular, the measured quantity is the motor current for operating the motor of the mixing tool. Alternatively or in addition to the motor current, the torque is also provided as measured quantity in one configuration. Alternatively or in addition, a speed (rate of rotation), e.g. a target speed or actual speed, can also be taken into account. From the measurement of the motor current and/or the speed, the resistance of the food during chopping and/or mixing of the food can be determined. Preferably the viscosity of the food can be determined for a recipe or recipe step with a viscous food. But also when chopping hard food components such as ice cubes, this can be advantageous, e.g. to avoid the cutting edge of the mixing tool becoming blunt, which also affects the quality of the cooking result. Furthermore, by measuring the motor current and/or the speed, it is possible to detect, for example by means of a similarity value, whether the user has fed carrots instead of onions. Monitoring at a recipe-dependent or recipe-step-dependent analysis time, especially with a short time window, enables reliable monitoring and high quality in the above-mentioned exemplary cases.

In one configuration it is provided that several defined analysis times or analysis temperatures are provided, preferably at least two and/or at most ten during a recipe or recipe step. A very good result of a preparation can thus be ensured in a further improved manner.

In one embodiment several sensors are adapted to measure one measured quantity each and the measurement of the sensors includes at least one measured value per measured quantity, i.e. each sensor measures at least once. The plurality of characteristic values is calculated on the basis of the measurements of several measured quantities. This enables the calculation of particularly characteristic characteristic values, which for example allow statements about the thermal conductivity of a food. A very good result of a preparation can be ensured in a further improved manner in this way.

In one configuration a characteristic value is calculated which correlates with the thermal conductivity of the food in the food preparation vessel. The sensors used are a weight sensor and a sensor for measuring the electrical power used to operate a heating element. The weight sensor for measuring weight allows in one configuration to determine the weight of a food or ingredients of a food in the food preparation vessel. The same always applies to the preparation of a drink. The sensor for measuring the electrical power for the heating element allows in one configuration to determine the heat input into the food in the food preparation vessel. As the heat input is equal to the product of mass, temperature change and specific heat capacity, the heat capacity of the food in the food preparation vessel can be calculated as a characteristic value very easily. Since for example typical ingredients such as water and oil regularly have very different specific heat capacities, the heat capacity is particularly suitable for ensuring very good preparation results.

In one configuration at least two sensors are initially used independently of each other to each measure a measured quantity in parallel, to determine a plurality of characteristic values and to obtain a similarity value by means of a desired profile. In this way, at least two independent similarity values are determined, which are then logically combined with each other. Preferably, the resulting value is further processed, e.g. by averaging or maximum or minimum formation. Depending on a threshold value comparison, an action can be initiated. Preferably, a weight sensor is used as a first sensor and a temperature sensor in parallel as a second sensor to obtain a first similarity value from the temperature and a second similarity value from the weight. A value is calculated from the obtained thermal similarity value and the mechanical similarity value, which is further processed and evaluated for further monitoring. If two different sensors are present, for example only one thermal behaviour may be used for a first recipe and a combination of thermal and mechanical behaviour may be used for a second recipe in an advantageous manner. In one configuration the plurality of characteristic values, a desired profile and/or a monitoring threshold can be arranged such that a defined ingredient is taken into account in the monitoring. In particular, the defined ingredient is desired. Alternatively or additionally the defined ingredient is not desired. A particularly high quality cooking result can thus be achieved.

In one configuration a temperature sensor and a sensor for measuring the electrical power for a heating element are provided, each of which measures at least one measured value at a defined analysis time. For certain foods, ingredients and ingredient mixtures this results in a characteristic temperature curve as a function of the heat input, i.e. energy input. Deviations in the components of the ingredient mixture thus lead to different temperature curves. By measuring a pair of values for temperature and heat input, one or more meaningful characteristic values can be obtained by means of stored curves or a stored look-up table for the respective recipe or recipe step by only one punctual measurement which characteristic values are particularly effective for monitoring using a desired profile to identify a deviation, e.g. vinegar, oil or soy sauce instead of water. This leads to a low similarity value, for example below a monitoring threshold. If vinegar, oil or soy sauce is used instead of water, the similarity value is below the monitoring threshold or e.g. <10%. Although it would increase the computational effort, it is basically possible in one configuration to implement the monitoring additionally for typical variations of the user when implementing a recipe or recipe step, e.g. vinegar, oil or soy sauce instead of water, and to evaluate the resulting similarity value in an inverted manner together with at least one other similarity value.

In one configuration, the action that is initiated in dependence of the monitoring result is an output of an indication to the user, e.g. via a display, the automatic change of a cooking parameter, an automatic change of the recipe, the recipe step, the following recipe step or the recipe guidance or a discontinuation of the food preparation process. In one configuration, the indication can be an information or output of the monitoring or monitoring result or comprise an instruction to the user to intervene in the food preparation process. Cooking parameters are in particular the target temperature of the heating element, the electrical power for the heating element, the current for the motor of the mixing tool, the target speed or the target torque of the mixing tool. The discontinuation as an action is particularly preferred, because this can prevent a bad cooking result that would violate the "guaranteed success". This is based on the knowledge that a bad tasting food is more negative for a user than the discontinuation of the food preparation process or cooking process.

In one configuration, the monitoring device is configured such that the monitoring takes place only from a minimum temperature of 100° C., preferably 110° C., particularly preferably 120° C. Above the minimum temperature, the food preparation process and any deviations have a particularly large influence on the reproducibility and quality of the cooking result compared with temperature ranges below the minimum temperature. In this case, the user preferably has no possibility to manually intervene in the automatic process except to discontinue the cooking process. In particular, the user can only set a target temperature up to the minimum temperature and/or a target temperature above the minimum temperature can only be initiated automatically by the recipe selected by the user or the recipe step activated by the user. By specifying a minimum temperature for monitoring, computing capacity that would be less effective in lower temperature ranges can be shifted to an expansion of monitoring above the minimum temperature. A very effective and efficient monitoring can thus be obtained. At the same time, by specifying a minimum temperature above which the user has no possibility of manual intervention other than discontinuing the cooking process, the food preparation process can be influenced in a correcting manner by an initiated action of the monitoring above the minimum temperature. This can lead to an improved cooking result.

A further aspect of the present disclosure relates to a method for monitoring a food preparation process which is carried out by means of a food processor for heating, chopping and/or mixing a food in a food preparation vessel. A condition of the food processor and/or the food is measured, a monitoring result is determined based on the measured condition and an action is initiated in dependence of the monitoring result. A temperature of the food preparation vessel is detected. The monitoring takes place in dependence of a recipe for preparing a food only from a minimum temperature of 100° C., preferably 110° C., especially 120° C. The advantages resulting from this as well as further embodiments of this aspect of the present disclosure can be seen from the above description of the preceding aspect of the present disclosure, which also applies to this method.

The invention claimed is:

1. A method for performing a food preparation process with a food processor, the method comprising:

heating by a heating element of the food processor;

chopping or mixing a food by a mixing tool of the food processor, the food processor including a food preparation vessel configured to carry out a food preparation process;

arranging at least two sensors in the food processor, wherein a first sensor of the at least two sensors is at least one of a temperature sensor and a weight sensor being configured to measure temperature values of a temperature of a food in the food preparation vessel or weight values of a weight of a food in the food preparation vessel, respectively, wherein a second sensor of the at least two sensors is at least one of a sensor configured to measure electrical power values used to operate the heating element for heating a food and a sensor configured to measure motor current values for driving the mixing tool, wherein the first sensor is configured to determine one or more first measured values and the second sensor is configured to determine one or more second measured values;

monitoring a condition of at least one of the food processor or a food in the food preparation vessel via a monitoring device, the monitoring including calculating, via the monitoring device, a plurality of up to forty characteristic values by different mathematical operations, wherein, in order to calculate each characteristic value of the plurality of up to forty characteristic values, the monitoring device is configured to perform a mathematical operation of the different mathematical operations on at least one of (i) the one or more first measured values or (ii) the one or more second measured values, the mathematical operation outputting a resultant numerical value that describes a characteristic of the condition of the at least one of the food processor or the food in the food preparation vessel, wherein the mathematical operation includes determining a mean value and at least one of determining a standard deviation, an integral value, a derivative value, a mean absolute deviation, or a Fast Fourier Transform, the monitoring further including calculating the resultant numerical value of at least one characteristic value that includes the mean value and calculating the resultant numerical value of at least one other characteristic value different from the at least one characteristic value that includes at least one of the standard deviation, the integral value, the derivative value, the mean absolute deviation, or the Fast Fourier Transform;

accessing, via the monitoring device, a plurality of recipe steps of a recipe for the food preparation process, wherein a desired profile, which can be accessed by the monitoring device, is provided for each recipe, the desired profile including at least one of a system of equations or an algorithm that defines a functional relationship between the plurality of up to forty characteristic values and a monitoring result, the monitoring result being a similarity value which describes the similarity of the condition of at least one of the food processor or a food in the food preparation vessel to an ideal condition;

inputting the plurality of up to forty characteristic values into the at least one of the system of equations or the algorithm of the desired profile;

determining, via the at least one of the system of equations or the algorithm of the desired profile, the monitoring result based on the plurality of up to forty characteristic values; and initiating, via the monitoring device, an action that adjusts operation of the food processor based on the monitoring result.

2. The method of claim 1, wherein the sensor is adapted for measuring only one measured quantity and the measurement of the sensor, on the basis of which the plurality of characteristic values ($K_1$, $K_2$, . . . $K_n$) is calculated, includes several time-resolved measured values ($M1_1$, $M1_2$, . . . $M1_t$) of the measured quantity.

3. The method of claim 1, further comprising:

accessing, via a control unit of the food process, a plurality of recipes, each of the plurality of recipes includes a plurality of recipe steps; and controlling, via the control unit, the food preparation process for the food at least partially automatically on the basis of at least one of an accessed recipe and the recipe steps of the accessed recipe.

4. The method of claim 3, wherein for each recipe step of the accessed recipe, a separate desired profile is provided which can be accessed by the monitoring device for monitoring the measured condition.

5. The method of claim 3, wherein the desired profile is a system of equations or the algorithm that comprises weighting factors ($\alpha_1$, $\alpha_2$, . . . $\alpha_n$) specified for the respective recipe or recipe step to provide a recipe-dependent or recipe step-dependent desired profile.

6. The method of claim 5, wherein according to a desired profile, each characteristic value ($K_1$, $K_2$, . . . $K_n$) is assigned a weighting factor ($\alpha_1$, $\alpha_2$, . . . $\alpha_n$) for weighting the characteristic value ($K_1$, $K_2$, . . . $K_n$).

7. The method of claim 1, wherein the monitoring result is a similarity value which describes the similarity of the measured condition to the desired profile as a percentage between 0 and 100.

8. The method of claim 7, wherein a monitoring threshold is provided for the similarity value and the monitoring device is configured such that if the similarity value falls below the monitoring threshold, the action is initiated.

9. The method of claim 1, wherein the monitoring device is configured such that monitoring takes place during the food preparation process at a recipe-dependent analysis time or within a recipe-dependent time window.

10. The method of claim 1, wherein the resultant numerical value of the at least one other characteristic value includes an integral value or a derivative value.

11. The method of claim 1, wherein the resultant numerical value of the at least one other characteristic value includes a mean absolute deviation and standard deviation.

12. The method of claim 1, wherein the resultant numerical value of the at least one other characteristic value includes a Fast Fourier Transform.

13. The method of claim 1, wherein the resultant numerical value of the at least one other characteristic value includes standard deviation.

14. A method for performing a food preparation process with a food processor, the method comprising:

heating by a heating element of the food processor;

chopping or mixing a food by a mixing tool of the food processor, the food processor including a food preparation vessel configured to carry out a food preparation process;

arranging at least two sensors in the food processor, wherein a first sensor of the at least two sensors is a weight sensor being configured to measure a weight of a food in the food preparation vessel, wherein a second sensor of the at least two sensors is a sensor configured to measure motor current values for driving the mixing tool, wherein the first sensor is configured to determine one or more weight values and the second sensor is configured to determine one or more motor current values;

monitoring a condition of at least one of the food processor or a food in the food preparation vessel via a monitoring device, the monitoring including calculating, via the monitoring device, a plurality of up to forty characteristic values by mathematical operations, wherein, in order to calculate each characteristic value of the plurality of up to forty characteristic values, the monitoring device is configured to perform a mathematical operation of the different mathematical operations on at least one of (i) the one or more weight values or (ii) the one or more and motor current values, the mathematical operation outputting a resultant numerical value that describes a characteristic of the condition of the at least one of the food processor or the food in the food preparation vessel, wherein the mathematical operation includes determining a mean value and at least one of determining a standard deviation, an integral value, a derivative value, a mean absolute deviation, or a Fast Fourier Transform, the monitoring further including calculating the resultant numerical value of at least one characteristic value that includes the mean value and calculating the resultant numerical value of at least one other characteristic value different from the at least one characteristic value that includes at least one of the standard deviation, the integral value, the derivative value, the mean absolute deviation, or the Fast Fourier Transform;

accessing, via the monitoring device, a plurality of recipe steps of a recipe for the food preparation process, wherein a desired profile, which can be accessed by the monitoring device, is provided for each recipe, the desired profile including at least one of a system of equations or an algorithm that defines a functional relationship between the plurality of up to forty characteristic values and a monitoring result, the monitoring result being a similarity value which describes the similarity of the condition of at least one of the food processor or a food in the food preparation vessel to an ideal condition;

inputting the plurality of up to forty characteristic values into the at least one of the system of equations or the algorithm of the desired profile;

determining, via the at least one of the system of equations or the algorithm of the desired profile, the monitoring result based on the plurality of up to forty characteristic values; and initiating, via the monitoring device, an action that adjusts operation of the food processor based on the monitoring result.

15. A method for performing a food preparation process with a food process, the method comprising:

heating by a heating element of the food processor;

chopping or mixing a food by a mixing tool of the food processor, the food processor including a food preparation vessel configured to carry out a food preparation process;

arranging at least two sensors in the food processor, wherein a first sensor of the at least two sensors is at least one of a temperature sensor and a weight sensor being configured to measure temperature values of a temperature of a food in the food preparation vessel or weight values of a weight of a food in the food preparation vessel, respectively, wherein a second sensor of the at least two sensors is at least one of a sensor configured to measure electrical power values used to operate the heating element for heating a food and a sensor configured to measure motor current values for driving the mixing tool, wherein the first sensor is configured to determine one or more first measured values and the second sensor is configured to determine one or more second measured values;

monitoring a condition of at least one of the food processor or a food in the food preparation vessel via a monitoring device, the monitoring including calculating, via the monitoring device, a plurality of up to forty characteristic values by different mathematical operations, wherein, in order to calculate each characteristic value of the plurality of up to forty characteristic values, the monitoring device is configured to perform a mathematical operation of the different mathematical operations on at least one of (i) the one or more first measured values or (ii) the one or more second measured values, the mathematical operation outputting a resultant numerical value that describes a characteristic of the condition of the at least one of the food processor or the food in the food preparation vessel, wherein the mathematical operation includes determining a mean value and at least one of determining a standard deviation, an integral value, a derivative value, a mean absolute deviation, or a Fast Fourier Transform, the monitoring further including calculating the resultant numerical value for at least one characteristic value that includes the mean value and calculating the resultant numerical value of at least one other characteristic value different from the at least one characteristic value that includes at least one of the standard deviation, the integral value, the derivative value, the mean absolute deviation, or the Fast Fourier Transform;

accessing, via the monitoring device, a plurality of recipe steps of a recipe for the food preparation process, wherein a desired profile, which can be accessed by the monitoring device, is provided for each recipe, the desired profile including at least one of a system of equations or an algorithm that defines a functional relationship between the plurality of up to forty characteristic values and a monitoring result, the monitoring result being a similarity value which describes the similarity of the condition of at least one of the food processor or a food in the food preparation vessel to an ideal condition;

inputting the plurality of up to forty characteristic values into the at least one of the system of equations or the algorithm of the desired profile;

determining, via the at least one of the system of equations or the algorithm of the desired profile, the monitoring result based on the plurality of up to forty characteristic values; and initiating, via the monitoring device, an action that adjusts operation of the food processor based on the monitoring result.

* * * * *